United States Patent [19]
Woodbridge et al.

[11] Patent Number: 6,020,653
[45] Date of Patent: Feb. 1, 2000

[54] SUBMERGED RECIPROCATING ELECTRIC GENERATOR

[75] Inventors: David D. Woodbridge, Tampa; Thomas C. Woodbridge, Satellite Beach, both of Fla.

[73] Assignee: Aqua Magnetics, Inc., Satellite Beach, Fla.

[21] Appl. No.: 08/972,428

[22] Filed: Nov. 18, 1997

[51] Int. Cl.⁷ ............................................. F03B 13/12
[52] U.S. Cl. .............................. 290/53; 290/42; 60/495
[58] Field of Search ................................ 290/42, 43, 53, 290/54; 60/495, 497

[56] References Cited

U.S. PATENT DOCUMENTS

| | | | |
|---|---|---|---|
| 3,231,749 | 1/1966 | Hinck, III | 290/53 |
| 3,362,336 | 1/1968 | Kafka | 103/44 |
| 3,546,473 | 12/1970 | Rich | 290/42 |
| 3,696,251 | 10/1972 | Last et al. | 290/53 |
| 3,783,302 | 1/1974 | Woodbridge | 290/42 |
| 4,110,630 | 8/1978 | Hendel | 290/53 |
| 4,239,976 | 12/1980 | Collard | 290/42 |
| 4,260,901 | 4/1981 | Woodbridge | 290/42 |
| 4,539,485 | 9/1985 | Neuenschwander | 290/53 |
| 4,631,921 | 12/1986 | Linderfelt | 60/501 |
| 5,136,173 | 8/1992 | Rynne | 290/53 |
| 5,411,377 | 5/1995 | Houser et al. | 417/333 |
| 5,696,413 | 12/1997 | Woodbridge et al. | 310/15 |

*Primary Examiner*—Nicholas Ponomarenko
*Attorney, Agent, or Firm*—William M. Hobby, III

[57] ABSTRACT

A submerged reciprocating electric generator is placed below the ocean surface and creates electric power from the surface ocean swells. The generator coil reciprocates linearly in response to an external force acting on a float by passing ocean swells. A cable connects the float on the ocean surface with the reciprocating coil of the submerged generator. A magnetic field is focussed through the coil as it reciprocates, creating an electromotive force in the coil. The magnetic field is created in such a manner as to provide uniform field of a single magnetic orientation throughout the entire length of motion of the reciprocating coil. The generator includes a base formed on the ocean floor supporting magnetic core having a generator coil movably mounted therein and connected to a float with a cable passing through cable alignment bearings. Electromagnetic windings are mounted at the closed end of the generator magnetic flux core.

11 Claims, 3 Drawing Sheets

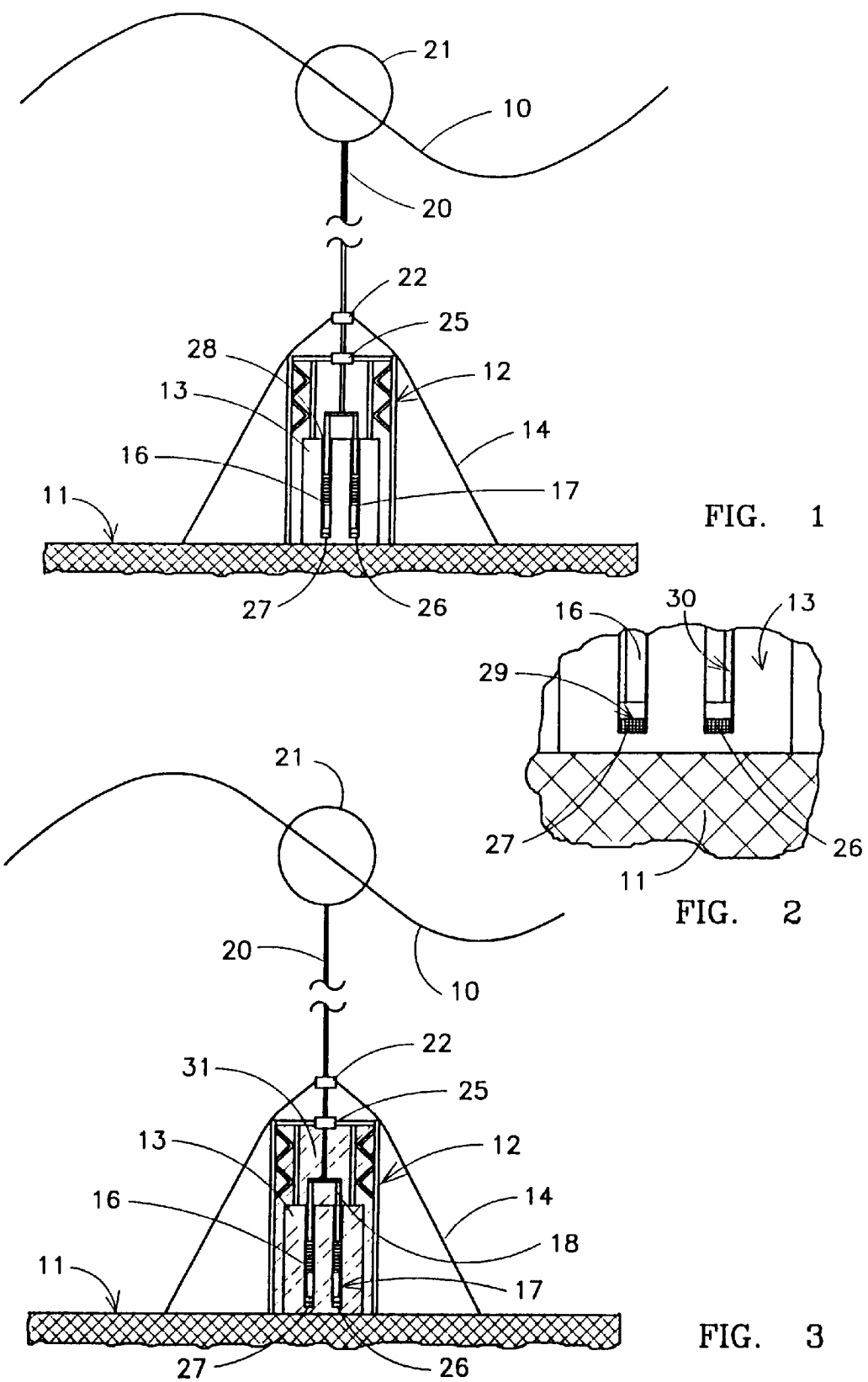

SUBMERGED RECIPROCATING ELECTRIC GENERATOR

BACKGROUND OF THE INVENTION

The present invention relates to an electrical generator and especially to a submerged reciprocating electric generator which produces electric power responsive to movement of a float riding in an oscillating fluid. This application is a continuation in part of prior U.S. patent application Ser. No. 08/327,593 for RECIPROCATING ELECTRIC GENERATOR filed Oct. 10, 1994, now U.S. Pat. No. 5,696,413.

Open ocean swells contain large amounts of energy which can be utilized as an alternative source of electric power. This type of energy source does not create pollution or depend on finite resources. In the past, a variety of systems have been utilized to generate electric power from ocean swells by converting the motion of the waves to some other form of energy to turn a conventional rotating generator. This type of system can be seen in prior systems which use wave motion to drive a hydraulic pump to force a fluid through a turbine connected to an electrical generator. Other ocean energy systems use wave motion to force air through hollow shafts. One such system uses a by-directional turbine placed in the air shaft to produce electric power. The air is forced up the shaft by the oncoming waves and is sucked back from the shaft as the wave recedes. The air motion in the shaft then turns the turbine which drives the generator. Each of these systems suffers from loss of efficiency in the process of converting wave motion into movement of a fluid and in turn use the fluid motion to turn a turbine which drives a generator.

Prior U.S. patents which can be seen for producing electrical energy from ocean wave motion can be seen in the Rich U.S. Pat. No. 3,546,473, for an Oceanographic Generator which uses two floats, one which follows the displacement of the water surface and another which remains in a substantially stable position independent of the motion of the water and has a permanent magnet and coil attached to the float. An electromotive force is induced in the coil upon the occurrence of a relative motion between the floats. In the Last et al. U.S. Pat. No. 3,696,251, a Method of Generating Electricity and an Electrical Generator derive electrical energy from oscillatory motion, such as in buoys or in vehicles or on animals. The generator has a stator and an armature coupled together by spring means and is effective to generate electrical current when body movement of the generator causes, by inertia effects, relative movement of the armature and stator. In the R. S. Kafka U.S. Pat. No. 3,362,336, a Wave Motion Operated Device is provided in a two component device which uses the wave motion to achieve a pumping action to pump out the bilge of a boat. Another embodiment of the invention is for an electric power generating arrangement in which the wave motion causes the generation of current which can be rectified and thereafter used for recharging the batteries of the boat.

The Hinck III U.S. Pat. No. 3,231,749, shows a Wave Power Generator especially for use in buoys and provides an apparatus for absorbing the energy available in the rocking mode of oscillation by converting it into electrical energy. In the Collard U.S. Pat. No. 4,239,976, a Floating Electric Generator produces electric power from the flow of water using a floating rotor journalled on a non-rotating shaft which is moored in place. The rotor is turned by peripheral vanes engaging the flow of water.

In the Woodbridge prior U.S. Pat. No. 3,783,302, an apparatus and method for converting wave energy into electrical energy uses floats to move a flexible coil in a magnetic field. In Woodbridge U.S. Pat. No. 4,260,901, a wave operated electrical generator system uses floats to oscillate arcuate permanent magnets into and out of electrical coils.

In contrast, the present invention is directed towards an electric generator adapted to increase the efficiency of a linear moving coil directly moved by a float riding on waves or other oscillation fluids in a manner to convert as much of the potential energy in the wave directly to electrical energy in locations where there is constant wave motion. A permanent magnet core electric generator having a linearly moving coil which is annularly wound on a sleeve moving coaxially in a coaxial bore formed with a center pole flux core in the center of the sleeve and an outer pole flux core on the exterior of the annular bore, both of which can be lined with permanent magnets. The arrangement of the magnets is in such a manner to create a uniform magnetic field of a single magnetic orientation throughout the entire length of the motion of the linearly moving coil.

In addition, an electromagnetic winding mounted in the closed end of the magnetic core, receives a small portion of the electric energy generated by the linearly moving coil. This in turn increases the magnetic field within the coaxial bore, which increases the electrical output of the reciprocation generator to the maximum energy available in the passing ocean swells.

SUMMARY OF THE INVENTION

A submerged reciprocating electric generator is placed below the ocean surface and creates electric power from the surface ocean swells. The Generator coil reciprocates linearly in response to an external force acting on a float by passing ocean swells. A cable connects the float on the ocean surface with the reciprocating coil of the submerged generator. A magnetic field is focussed through the coil as it reciprocates, creating an electromotive force in the coil. The generator includes a base formed on the ocean floor supporting a magnetic core having a generator coil movably mounted therein and connected to a float with a cable passing through cable alignment bearings. Electromagnetic windings are mounted at the closed end of the generator magnetic flux core.

BRIEF DESCRIPTION OF THE DRAWINGS

Other objects, features, and advantages of the present invention will be apparent from the written description and the drawings in which:

FIG. 1 is a sectional view of a submerged reciprocating electric generator in accordance with the present invention mounted to the ocean floor under ocean swells;

FIG. 2 is a sectional view of the bottom of the electric generator of FIG. 1;

FIG. 3 is a sectional view of the electrical generator of FIGS. 1 and 2 in a watertight housing;

DESCRIPTION OF THE PREFERRED EMBODIMENT

Figure 4:
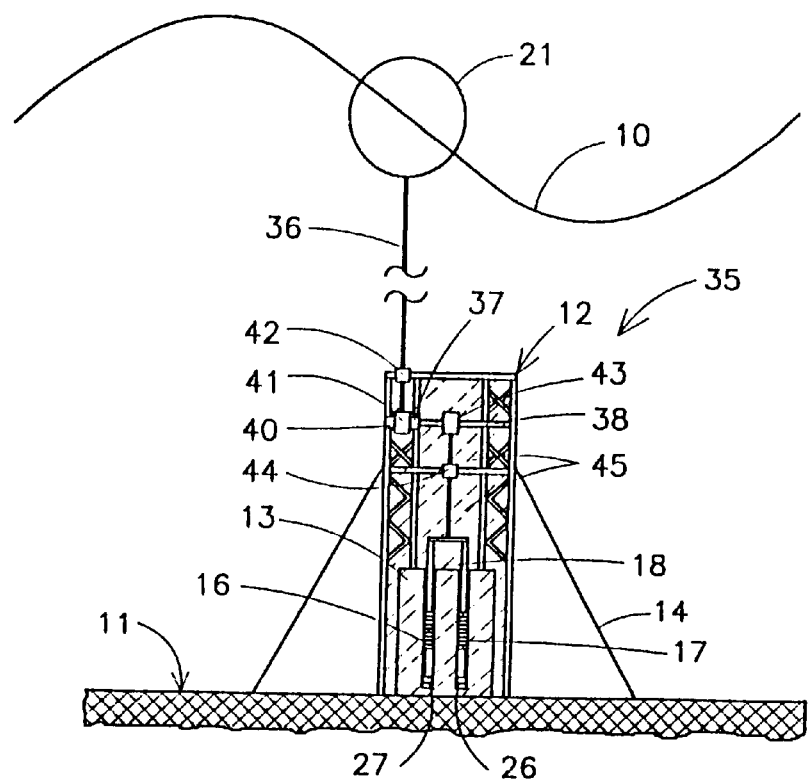
FIG. 4 is a sectional view of an alternate embodiment of the electric generator of FIGS. 1–3.

Referring to the drawings, FIGS. 1 through 3, an electrical generator for generating electric power from ocean swells in a body of water 10 having a floor 11. A frame structure 12 has a magnetic core 13 supported thereon to the ocean bottom 11. The frame structure 12 has a plurality of support cables 14 anchoring the top 22 of the frame structure 12 to the ocean floor 11. The magnetic core 13 has an annular elongated bore 16 extending thereinto and has an annular generator coil 17 mounted on a coil support tube 18 slidably mounted in the elongated annular bore 16. A cable 20 is attached to the top of the generator coil support tube 18 at one end and attached to a float 21 at the other end which float 21 rides in the swell of the ocean surface 10. A first cable alignment bearing 22 guides the cable 20 therethrough while a cable alignment bearing 25 further guides the cable into the base structure 12 to assist in maintaining the generator coil 17 sliding back and forth within the annular bore 16 in alignment with the bore. The bore 16 has an electromagnetic winding 26 mounted in the closed end 27 of the bore 16 while the open end 28 of the bore 16 is opened for the coil support tube 28 to slide into and out of the bore. A plurality of permanent magnets 30 are mounted in the annular bore 16 so that when the electrical coil 17 moves back and forth within the bore 16 within the magnetic field generated by the permanent magnets, electric power is produced within the coils 17. A small portion of electric energy generated in the generator coil 17 is passed through the coils 26 at the closed end 27 of the annular bore 16. This, in turn, generates an electromagnetic field within the magnetic core 13 which thereby increases the magnetic field generated by the permanent magnet 30 to increase the initial magnetic field in the generator air gap created by the permanent magnets. The increase in the magnetic field increases the efficiency in the power output of the linear generator. An approaching ocean swell raises the float 21 and pulls the generator coil 17 linerally upward through the magnetic field created by the permanent magnets 30 and by the electromagnet 26. The generator coil support tube 18 and the coil are weighted so that gravity pulls the coil back down through the magnetic field as the ocean swell passes the float 21. Cable alignment bearings 22 and 25 ensure that the cable acts on the generator coil in a purely vertical motion in the configuration shown. In FIGS. 1 and 2, the reciprocating generator is not watertight and water can flow in and out of the generator with each stroke of the generator coil. However, the flow of water in and out of the generator causes increased resistance to the linear motion of the coil. FIG. 3 illustrates the reciprocating generator of FIGS. 1 and 2 in which the reciprocating generator has been enclosed in a watertight housing 31. A watertight linear bearing 25 provides a seal where the cable enters the housing 31 formed around the structural frame 12. The watertight housing allows the generator coil to move freely up and down with the motion of the float 21 at the surface of the ocean 10. The linear bearing seal results in some resistance against the motion of the generator coil and float but this is made up by the increased efficiency of the movement of the generator coil 17 within the annular bore 16.

Turning to FIG. 4, a submerged reciprocating generator 35 is illustrated having a rotary bearing configuration. A submerged framework is attached to the floor 11 of the ocean or other body of oscillating fluid 10 and has the float 21 connected to a first flexible cable 36. The framework 12 has a watertight housing 31 and includes the magnetic core 13 having the annular generator coil 17 riding therein in the same manner as in FIGS. 1 through 3. An electromagnetic winding 26 is mounted at the closed end of the magnetic core 13 in the same manner as in FIGS. 1 through 3. Coil 17 is wrapped on an annular coil support tube 18. This embodiment has a rotary shaft 37 riding in bearings 38 and 40 and has a float cable drum 41 mounted thereon with the float cable 36 winding around the cable drum 41. The flexible cable 36 passes through a cable alignment bearing 42. As the float 21 moves up and down in the swells of the oscillating water 10, the cable 36 moves up and down and pulls the cable wrapped on the drum 41 up and down to rotate the shaft 37 which, in turn, rotates the coil cable drum 43 having the coiled cable 44 wrapped therearound on one end and extending through the bearing 44 and being attached to the generator coil support tube 18 at the other end of the cable. The coil 17 and tube 18 provide the counterweight for rotating the cable 45 on the drum 43 while the float 21 pulling and releasing the cable 36 rotates the shaft 37 by the cable wrapping and unwrapping on the drum 41. The support cables 14 hold the basic generator unit to the floor 11.

Figure 5:
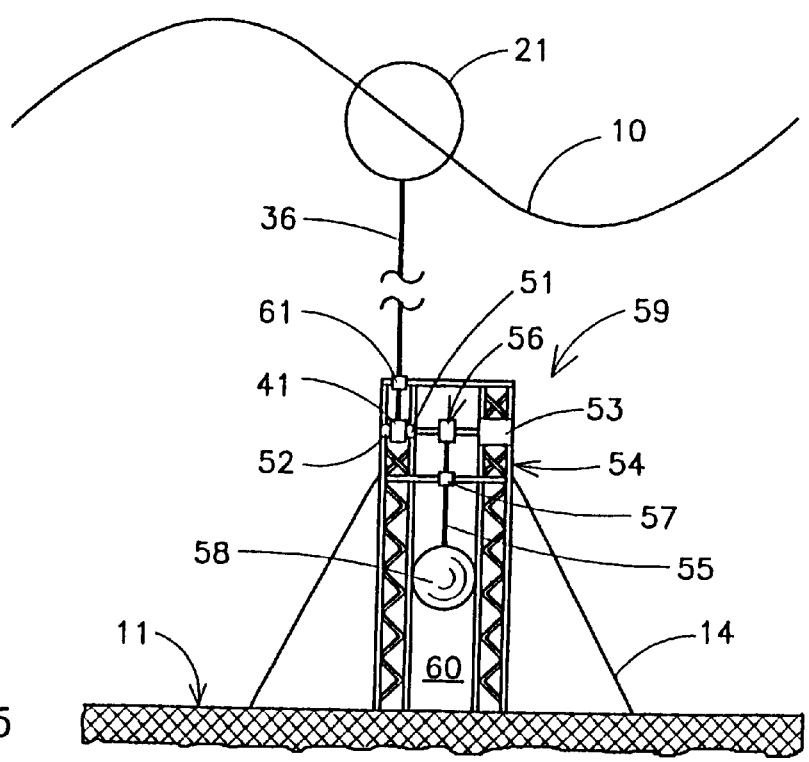
FIG. 5 is a sectional view of another embodiment of an electric generator of FIGS. 1 through 4.

Turning to FIG. 5, another embodiment of a submerged generator is illustrated having a submerged generator unit 50 having a float 21 riding on the oscillating fluid 10 with the generator unit 50 mounted to the floor 11 of the body of water 10. The generator unit 50 is supported with the support cables 14. In this embodiment, a first cable 36 rides on a drum 41 as it wraps and unwraps on the drum 41 to rotate the shaft 51 mounted between the bearings 52 and a rotary electric generator 53 mounted to the framework 54 of the generator 50. The second flexible cable 55 wraps on the coil cable drum 56 and is held in alignment with the alignment bearing 57. The cable 55 supports a counterweight 58 which rides within the guiding framework 60. Thus, as the swells in the ocean 10 raises the float 21, it unwraps the cable 36 from the drum 41 while wrapping the cable 55 from the drum 56 supporting the counterweight 58. Similarly, when the float 21 falls, the action is reversed to thereby provide a rotation in one direction and then in the other direction of the shaft 51 which can be connected to the shaft of rotary electric generator 53 which generates electricity in either direction of rotation of the shaft 51. Cable 36 is guided through a guide bearing 61 connected to the framework.

Figure 6:
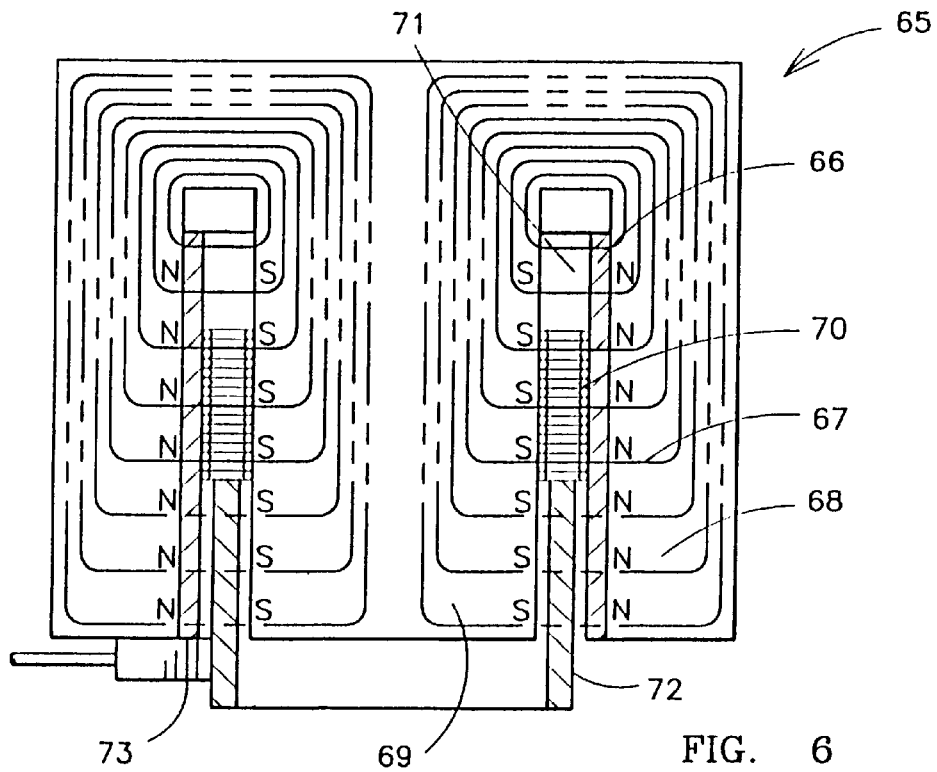
FIG. 6 is a sectional view of a reciprocating generator showing the magnetic poles of the permanent magnets.

As seen in FIG. 6, a generator 65 has the permanent magnets 66 mounted to show their north and south poles and the magnetic flux line 67 formed in the outer pole flux core 68 and in the center pole flux core 69 as the annular wound generator coil 70 moves linearly in the annular bore 18 adjacent the magnets 66. The magnets 66 are mounted around the exterior of the annular bore 71. The wound coil 70 is mounted on a coil support sleeve 72 which may be the float drive tube which in turn is connected to the float. As shown in FIG. 6, power generated in the moving coils is transmitted through linear electrical bushings and brushes 73. The bushings are connected through to the coils.

Figure 7:
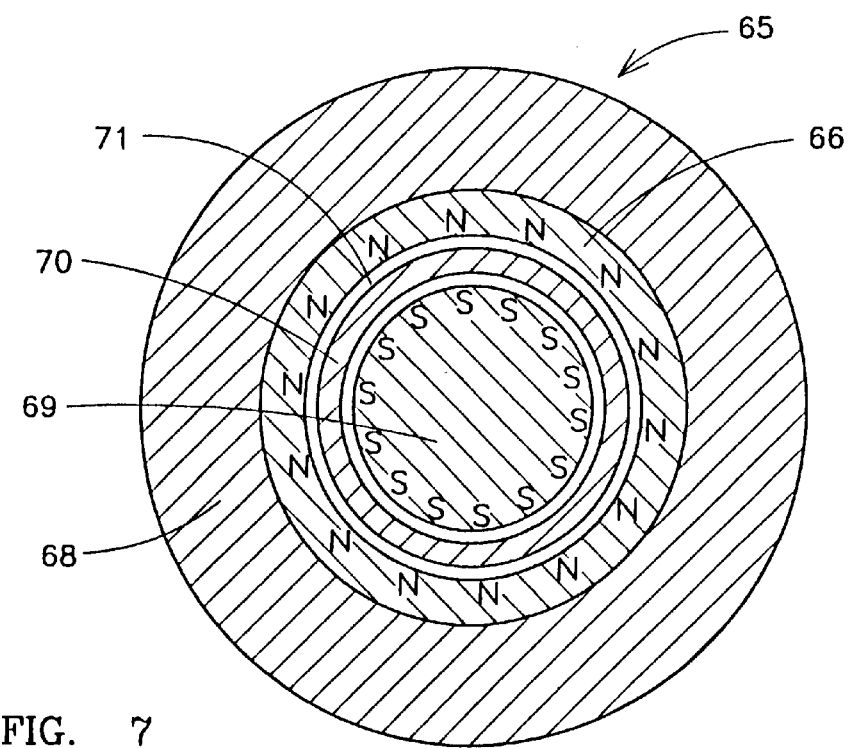
FIG. 7 is a sectional view through a reciprocating generator.

In FIG. 7, a cross section of the generator 65 shows the outer pole flux core 68 and the center pole flux core 69 with the generator coil 70 mounted for linear action in the annular bore 71 adjacent the permanent magnets 66 mounted around the inside of the bore 71 to the outer pole flux core 68. The magnets can also be mounted to the exterior of the center pole flux core 69 along the inside of the annular bore 71.

It should be clear at this time that a submerged reciprocating linear generator has been provided for use below the ocean surface to create electric power from surface ocean swells. The generator coil reciprocates linerally in response to an external force acting on the float by the passing ocean swell while the cable connects the float on the ocean surface with the reciprocating coil of the submerged generator. A magnetic field is focused through the coil as it reciprocates, creating a electro-motive force in the coil. A small portion of the electric power created in the generator coil moving within a magnetic field created with the permanent magnets is passed through the electromagnetic winding in the closed end of the linear bore of the electric generator and used to increase the magnetic field in the magnetic core and hence the power output of the generator. It should be clear at this time, however, that the present invention is not to be considered limited to the forms shown which are to be considered illustrative rather than restrictive.

I claim:

1. A reciprocating electric generator for use in an oscillating fluid comprising:

a magnetic core having an elongated annular bore extending thereinto and having a bore open end and a bore closed end, said magnetic core being adapted to be submerged in an oscillating fluid;

at least one elongated permanent magnet mounted in said magnetic core along said elongated annular bore;

a generator coil formed on a coil support sleeve and slidably mounted in said annular bore;

an electromagnetic winding mounted in said magnetic core annular bore closed end and being electrically coupled to said generator coil to thereby generate an electromagnetic field within said core when said generator coil is moving within said permanent magnet magnetic field thereby increasing the magnetic field in said magnetic core;

a float member attached to said generator coil for moving said generator coil responsive to movement of said float on an oscillating fluid, whereby said electric generator can produce electric power responsive to movement of a float when said float is positioned to float on an oscillating fluid.

2. A reciprocating electric generator for use in an oscillating fluid in accordance with claim 1 including a plurality of permanent magnets mounted in said magnetic core annular bore.

3. A reciprocating electric generator for use in an oscillating fluid in accordance with claim 2 including a flexible cable connecting said float to said generator coil.

4. A reciprocating electric generator for use in an oscillating fluid in accordance with claim 3 including a frame structure attached to said magnetic core for anchoring said magnetic core submerged in said oscillating fluid.

5. A reciprocating electric generator for use in an oscillating fluid in accordance with claim 4 in which said frame structure has a cable alignment bearing attached thereto for guiding said flexible cable between said magnetic core and said float.

6. A reciprocating electric generator for use in an oscillating fluid in accordance with claim 5 in which said frame structure has a pair of cable alignment bearings.

7. A reciprocating electric generator for use in an oscillating fluid in accordance with claim 6 in which said frame structure has a plurality of support cables attaching said frame structure to a bottom surface beneath said oscillating fluid.

8. A reciprocating electric generator for use in an oscillating fluid in accordance with claim 4 in which said frame structure has a float cable drum rotatably attached thereto and has a flexible cable connected to said float and wrapped around said cable drum and a second flexible cable attached to said generator coil and wrapped around said rotatable drum whereby movement of said float rotates said float cable drum to raise and lower said generator coil within the magnetic field.

9. A reciprocating electric generator for use in an oscillating fluid in accordance with claim 8 in which said frame structure has a first cable alignment bearing attached thereto and said second flexible cable passing therethrough.

10. A reciprocating electric generator for use in an oscillating fluid in accordance with claim 9 in which said frame structure has a second cable alignment bearing attached thereto and said first flexible cable passing therethrough.

11. A reciprocating electric generator for use in an oscillating fluid in accordance with claim 9 in which said float cable drum is rotatably mounted in water tight bearing attached to said frame structure.

* * * * *